United States Patent [19]

Kapteina et al.

[11] 4,382,139

[45] May 3, 1983

[54] PROCESS AND APPARATUS FOR CONTINUOUS PRODUCTION OF POLYESTERS

[75] Inventors: Friedhelm Kapteina, Gelsenkirchen; Jürgen Rink, Hattingen, both of Fed. Rep. of Germany

[73] Assignee: Didier Engineering GmbH, Essen, Fed. Rep. of Germany

[21] Appl. No.: 329,619

[22] Filed: Dec. 10, 1981

[30] Foreign Application Priority Data

Dec. 17, 1980 [DE] Fed. Rep. of Germany ....... 3047474

[51] Int. Cl.³ .............................................. C08G 63/70
[52] U.S. Cl. .................................... 528/502; 528/272; 528/480; 528/308.3; 526/64; 526/65
[58] Field of Search ................ 528/272, 309, 480, 502

[56] References Cited

U.S. PATENT DOCUMENTS 3,867,349  2/1975  Heeg et al. ...................... 528/309 X
4,138,544  2/1979  Janssen et al. ...................... 528/272
4,237,261 12/1980  Kawamura et al. ................ 528/272
4,313,870  2/1982  Imai et al. ........................ 528/309 X

*Primary Examiner*—Lucille M. Phynes
*Attorney, Agent, or Firm*—Wenderoth, Lind & Ponack

[57] ABSTRACT

Process and apparatus for continuous production of polyesters, characterized by an improvement in the esterification or interesterification stage, in which a mixture containing the starting materials, for example, terephthalic acid and ethylene glycol, is subjected to the shearing and homogenizing action of a rotor-stator, and the resultant homogeneous mixture is introduced into a thin-layer evaporator to produce a reaction mixture containing low molecular weight bis-hydroxyalkylene ester. This lower molecular weight product is then subjected to precondensation and polycondensation in accordance with conventional procedures to obtained the desired polyester product. In accordance with the present invention, the esterification degree can be increased substantially, without deteriorating the quality of the polyester.

9 Claims, 4 Drawing Figures

PROCESS AND APPARATUS FOR CONTINUOUS PRODUCTION OF POLYESTERS

BACKGROUND OF THE INVENTION

The present invention relates to a process and apparatus for continuously producing a polyester. As is known in the art, continuous production of polyesters is customarily carried out in three stages. These are the esterification or interesterification stage, the precondensation stage, and the polycondensation stage. The present invention is particularly concerned with an improvement in the esterification or interesterification.

More specifically, the present invention is concerned with a process and apparatus for the continuous production of a polyester by means of the esterification of an aromatic dicarboxylic acid, for example, terephthalic acid, with an alkylene alcohol, for example, ethylene glycol, or by means of the interesterification of a diester of a dicarboxylic acid, for example, dimethyl terephthalate, with an alkylene alcohol, for example, ethylene glycol, to form a low molecular weight bis-β-hydroxyethylene terephthalate, precondensation under reduced pressure to form a higher molecular weight ethylene terephthalate, and polycondensation to form an even higher molecular weight polyethylene terephthalate (polyester), which, if desired, can be further processed.

The chemical reaction of an alkylene alcohol, particularly ethylene glycol (EG), with an aromatic dicarboxylic acid, for example, terephthalic acid (TPA), is an esterification reaction (direct esterification). The chemical reaction of a diester of a dicarboxylic acid, for example, dimethyl terephthalate, with an alkylene alcohol, particularly with ethylene glycol, is an interesterification reaction. The final product of both reactions is a low molecular weight bis-β-hydroxyethylene terephthalate (BHET).

In practice, the BHET is transformed into a higher molecular weight product in a precondensation stage under reduced pressure at an esterification degree of approximately 95%, and is finally polycondensed into an even higher molecular weight polyethylene terephthalate (polyester) in the polycondensation stage under a further reduced pressure, which permits further processing.

While, in the past, the production of polyester was mainly based on dimethyl terephthalate and ethylene glycol, terephthalic acid is mostly used today. However, there are problems with the direct esterification presently in practice, which are mainly due to the fact that terephthalic acid actually dissolves in bis-β-hydroxyethylene terephthalate, but practically does not dissolve in ethylene glycol, which results in a reduction in the esterification velocity. This negative effect is emphasized by the comparatively low reactivity of terephthalic acid with ethylene glycol, and this leads to undesirably long reaction times, which not only increases the complexity of the apparatus required and thus reduces the economy of the process, but also impairs the product quality.

There have been attempts to overcome this disadvantage of direct esterification by shortening the reaction time through varying the process parameters, for example, increasing the process temperature and such. However, there are limits for such measures which are determined by the product quality. Thus, for example, the side reactions increase with a rise in temperature, which leads to, among other substances, diethylene glycol (DEG), and this reduces the product quality.

SUMMARY OF THE INVENTION

The object of the present invention is to overcome the problems associated with the prior art processes of producing polyesters as discussed above.

It is a particular object of the present invention to increase the reactivity of the terephthalic acid, and thus increase the reaction velocity of the esterification, while maintaining excellent product quality.

Additional objects of the present invention will be apparent from the following discussion.

In accordance with the present invention, these objects are accomplished by a process and apparatus for continuous production of a polyester which comprises means for reacting (A) a normally solid aromatic dicarboxylic acid or a normally solid diester of an aromatic dicarboxylic acid with (B) a normally liquid alkylene glycol, to produce a low molecular weight bis-hydroxyalkylene ester of the aromatic dicarboxylic acid, means for subjecting this ester to precondensation under reduced pressure to produce an intermediate ester product of increased molecular weight, and means for subjecting the intermediate ester product to polycondensation under further reduced pressure to increase its molecular weight and thus produce the polyester, said process and apparatus being characterized by an improvement which comprises providing means for subjecting a mixture containing the starting materials (A) and (B) to the shearing and homogenizing action of a rotor-stator, wherein the mixture is axially sucked into the rotor and subjected to shearing and homogenizing action in the rotor-stator to increase the surface area of the solid starting material (A) and to produce a homogeneous mixture containing (A) and (B), after which the homogeneous mixture is radially ejected from the stator, and also providing means for introducing the homogeneous mixture into a thin-layer evaporator wherein (A) and (B) are reacted with each other to produce a reaction mixture containing the low molecular weight bis-hydroxyalkylene ester.

BRIEF DESCRIPTION OF THE DRAWINGS

The present invention will be explained in more detail in the following with reference to the accompanying drawings wherein.

DETAILED DESCRIPTION OF THE INVENTION

Figure 1:
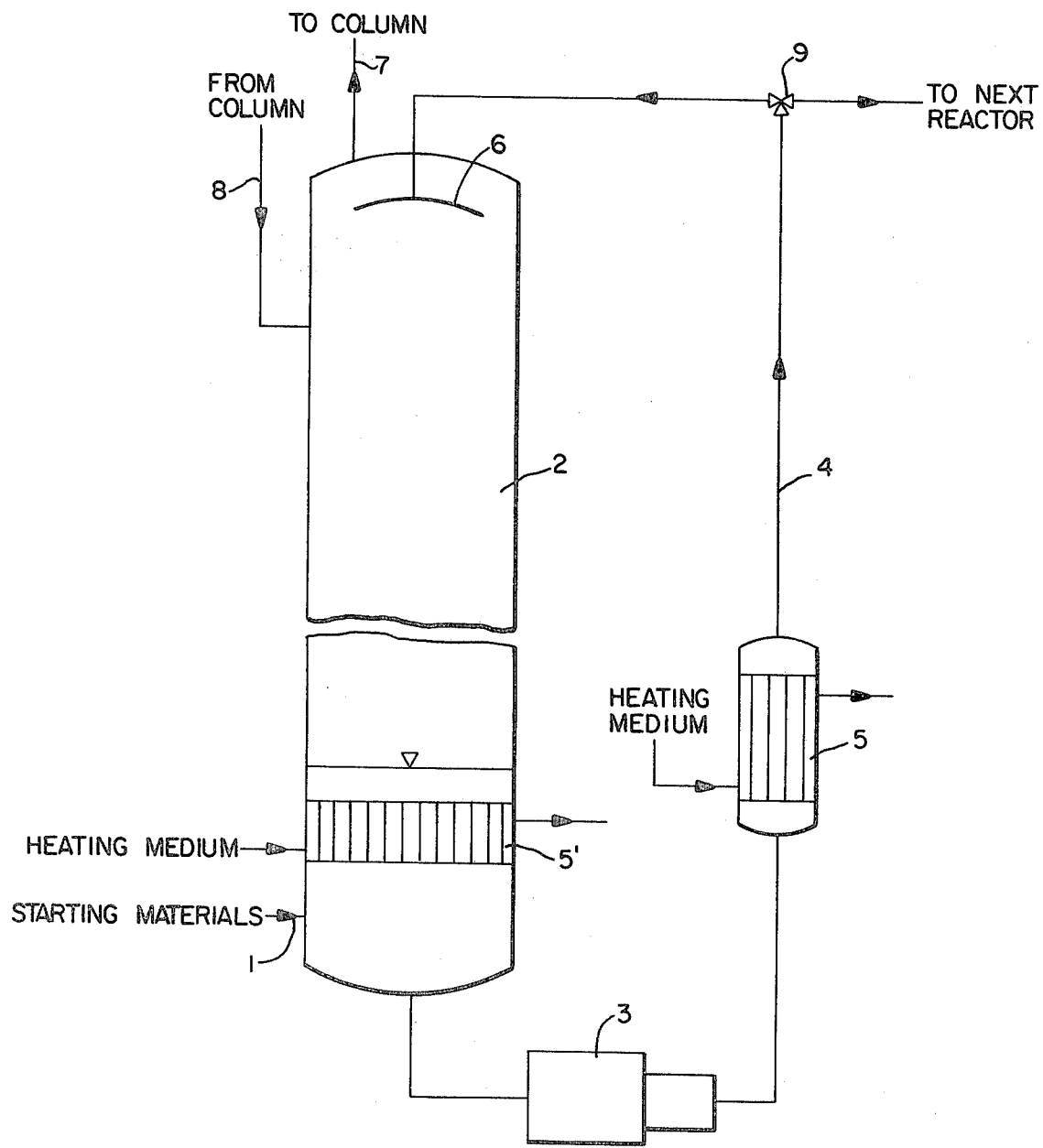
FIG. 1 is a schematic view of an apparatus for practicing the process of the present invention.

As indicated above, the central feature of the present invention resides in the combined use of a rotor-stator and a thin-layer evaporator.

The rotor-stator can be a single or multi-stage rotor-stator. The mixture of starting materials, optionally in admixture with reaction product, is sucked into the rotor and is radially ejected from the stator. Rows of teeth and holes arranged in a ring-shape on the rotor and stator, respectively, form a series of shearing gaps, which act on the mixture introduced into the rotor-stator.

Thus, the present invention makes use of the fact that the reactivity of terephthalic acid with ethylene glycol can be accelerated, i.e. the reaction velocity can be increased, merely by reducing the particle size of the terephthalic acid, i.e. by increasing the active surface area of the terephthalic acid. The present invention offers a simple means for accomplishing this purpose, which involves surprising effects and advantages. The practical utilization of this principle has not been achieved in the conventional processes, because of the particle size of the terephthalic acid produced by its suppliers in industry.

The operating principle or effect of the rotor-stator arrangement, discovered by P. Willems, has been used in other fields of technology, such as in the food processing industry, paper industry and feed producing industry. The rotor-stator arrangement can consist of one or more stages, and is similar to the radial turbine. The liquid flow is axially sucked into the device by a rotor, and is radially ejected from the device by a stator. During its residence in the rotor-stator, turbulent forces are set up which have a decisive influence in the shearing gaps formed by the rows of teeth and holes arranged in a ring-shape on the rotor and stator, respectively. Due to the occurrence of three-dimensional local velocity fluctuations, and those which in time occur with very frequent pressure fluctuations, the terephthalic acid is crushed into very fine particles, in the molecular-disperse range, thus increasing the active surface area of the terephthalic acid. Furthermore, a portion of the high power density concentrated in the shearing gaps is stored as potential surface energy, which leads to a surprising rise in the reactivity of the terephthalic acid with the ethylene glycol.

Another advantage of using the rotor-stator arrangement in the esterification reaction relates to the fact that the electrical energy supplied to the rotor-stator is partially dissipated into heat, causing a temperature rise in the reaction mixture when passing through the rotor-stator. This temperature rise leads to an increase in the reaction velocity of the esterification reaction when the reaction mixture subsequently enters the thin-layer evaporator. However, in spite of this temperature increase of the reaction mixture, there is no increased occurrence of side reactions, since the temperature of the mixture is quickly reduced, following the reaction, when the reaction product flows down the walls of the thin-layer evaporator. This temperature reduction is caused by the evaporation heat given off in the thin-layer evaporator.

Additionally, the rotor-stator arrangement also constitutes a decisive advantage in the effectiveness of the direct esterification in terms of the homogenization of the components of the reaction mixture. Normally, it is particularly difficult to disperse the terephthalic acid in the ethylene glycol in a homogeneous manner when a relatively small amount of ethylene glycol is to be used in relation to the amount of terephthalic acid, this being the preferred mode of operation for an economical process. However, in the present invention, because of the operation of the rotor-stator, excellent homogenization of the components of the reaction mixture can be achieved, even though the reaction mixture contains both solid and liquid portions prior to initiation of the esterification reaction.

The thin-layer evaporator employed in the present invention in conjunction with the rotor-stator can be designed, for example, as a pipe reactor. The use of a thin-layer evaporator provides for high heat exchange efficiency between the reaction product and the heating surfaces of the evaporator, and also for rapid material exchange of the reaction product in order to enable easy removal of by-products, produced during the reaction, from the reaction mixture. It also provides for short diffusion paths within the reaction product.

Thus, in accordance with the present invention, it is possible to increase the esterification velocity between the starting materials, providing for an overall economic production of polyester through a decrease in the size of the apparatus for a given product volume, and through a reduction in the amount of starting materials to be used.

In a preferred embodiment of the present invention, the starting materials are initially introduced into the bottom portion of the pipe reactor, and are subsequently drained off, in admixture with a portion of the reaction mixture, from the pipe reactor, and introduced into the rotor-stator. The homogeneous mixture ejected from the rotor-stator is preferably introduced into the top portion of the pipe reactor. This homogeneous mixture can be heated before it is introduced into the pipe reactor, or the mixture can be heated in the top portion of the pipe reactor.

It is also possible to heat the admixture of starting materials and reaction mixture in the bottom portion of the pipe reactor.

As a means for introducing the homogeneous mixture into the top portion of the pipe reactor, use can be made of a static or dynamic distribution system, such systems being known in the art.

Furthermore vaporous distillation products produced during the reaction in the pipe reactor can be vented from the top portion of the reactor. If desired, these distillation products can be purified and then returned to the reaction mixture, for example, the purified products can be introduced into the top portion of the pipe reactor.

It is also possible in accordance with the present invention to introduce at least a portion of the reaction mixture resulting from the first pipe reactor into a second pipe reactor of the same or different design as the first pipe reactor. For example, the reaction mixture resulting from the first pipe reactor can be introduced into a second pipe reactor for carrying out the precondensation stage, followed by the polycondensation stage in yet another reactor, to produce the final polyester product.

Referring now to FIG. 1, the homogeneously mixed raw materials are continuously fed into the bottom area of a reactor 2 through a pipe 1, said reactor consisting of a thin-layer evaporator with or without installed components. The raw material mixture is drained, optionally with the already present reaction mixture, from the bottom of reactor 2 and is fed into a single or multi-stage rotor-stator 3 where the raw materials are initimately admixed and begin to react with each other.

Figure 4:
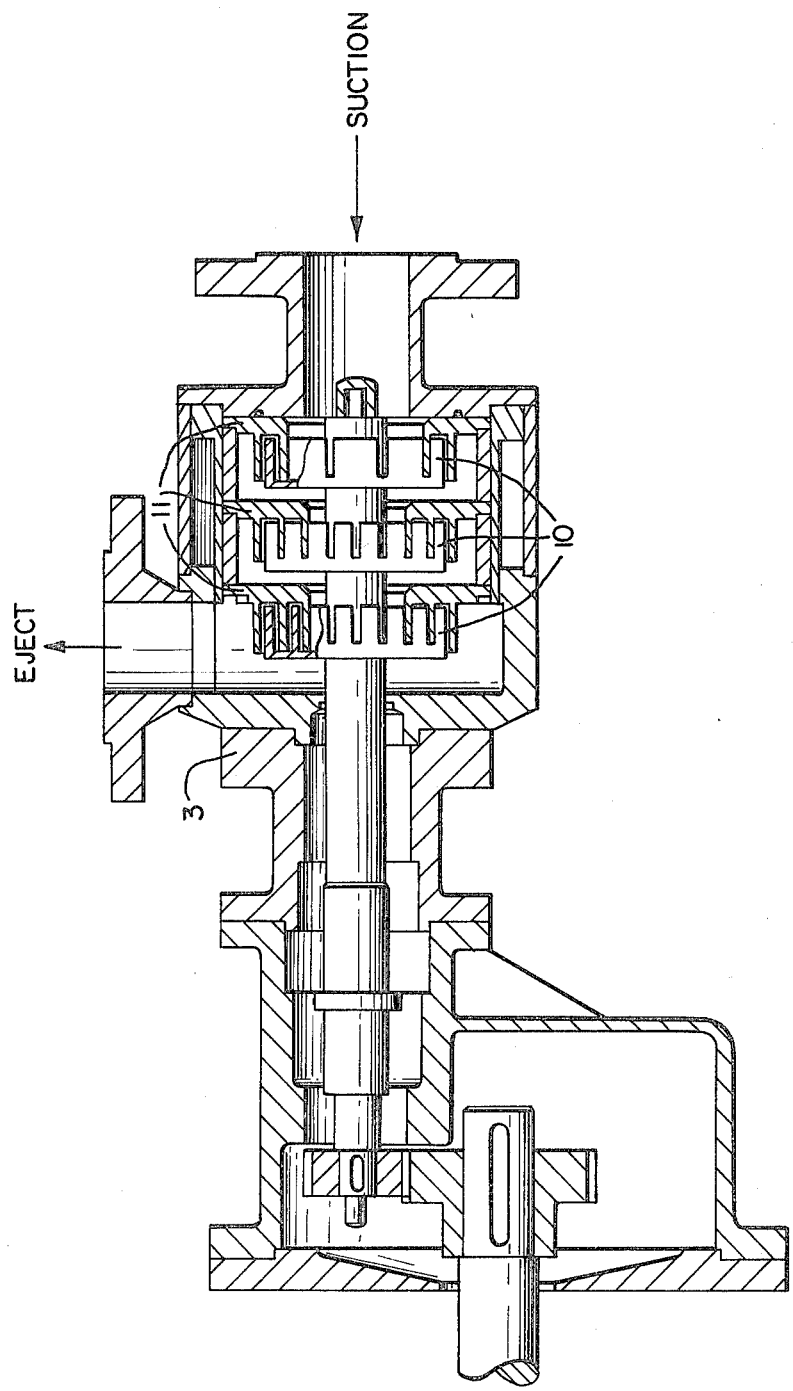
FIG. 4 is a cross-sectional side view of a rotor-stator which can be employed in practicing the present invention.

The rotor-stator arrangement 3 may be any structure which is capable of drawing in the mixture of solid starting material and liquid starting material, subjecting such mixture to a shearing and homogenizing action, to thereby increase the surface area of the solid starting material and to homogenize the mixture, and thereafter ejecting the resultant homogeneous mixture. A particularly suitable arrangement and preferred embodiment of the present invention is illustrated in FIG. 4, wherein there is shown a rotor-stator 3 which draws in the mixture of solid and liquid starting materials in an axial direction, subjects such mixture to a shearing and homogenizing action, and then discharges the homogenized mixture in a radial direction. It will be understood that the present invention is intended to encompass any structure capable of achieving such functions. However, the structure illustrated in FIG. 4 is preferred. In such structure, the rotor 10 has at least one annular projection, and the stator 11 has at least one annular recess, with the projection of the rotor extending into the recess in the stator. The drawn in mixture is caused to pass between the rotating projection of the rotor and the surfaces of the stationary recess of the stator. This causes a shearing and homogenizing action on the mixture, to thus increase the surface area of the solid starting material and to produce a homogeneous mixture, The projection of the rotor, and if necessary also the surfaces defining the recess in the stator, are provided with axial slots. Therefore, the homogeneous mixture is forced out of such slots and is ejected radially from the arrangement. In the illustrated structure of FIG. 4, there are three series-arranged rotor projection-stator recess assemblies, and the mixture is passed serially through these three arrangements. It is of course to be understood that the present invention may provide fewer or more than three such arrangements. Furthermore, other modifications to the structure illustrated in FIG. 4 may be made, as will be understood by those skilled in the art, as long as the resultant structure achieves the above-discussed functions of the present invention.

The rotor-stator can be positioned either at the top or at the bottom of the reactor 2. The reaction mixture is led to the top of the reactor 2 through a heated pipe 4 by means of the pumping effect of the rotor-stator 3.

The heating of the homogeneous reaction mixture can either be effected before it enters the reactor 2 in a heat source 5 or in the top or bottom area of the reactor 2 with a heat source 5' installed there.

The distribution of the reaction mixture in the top area of the reactor 2 is effected by means of a static or dynamic distribution system 6 in films, for example in the form of flowing threads. The reaction mixture flows thus from the top area into the sump area of the reactor 2 whereby the reaction by-products leave the reactor 2 through a line 7 branching off the top area of the reactor 2 and, after being rectified, for example in a distillation column, are supplied again to the reaction mixture in the reactor 2 through a line 8.

Optionally, the reaction mixture can also be supplied, either directly or as a side flow, into a second reactor of the same or another design through valve 9.

In the following examples, the reaction vessel consisted of a vertical pipe reactor without installed components having a machine flanged to the lower side of the reactor with an installed, one-stage rotor-stator arrangement which consisted of a toothed rotor and a recessed stator (borehole diameter 1.2 mm). A heated pipe led from this machine to the top part of the reactor vessel. During operation, a mixture of terephthalic acid and ethylene glycol was drained from the sump of the reactor by the pumping effect of the rotor-stator machine during the entire period of the test, and was pumped back into the top part of the reactor vessel where it flowed down the heated wall of the reactor vessel and back into the sump. The temperature of the reaction product was recorded on the suction as well as on the pressure side of the rotor-stator. The by-product vapors which developed during the reaction were blown off through a relief valve and condensed in a condenser.

In order to check the effectiveness of the process according to the invention, the reaction was carried out in an agitator vessel autoclave, as in a conventional process, under otherwise the same conditions.

The percentage content of DEG (diethylene glycol) was determined as follows: DEG and ethylene glycol were gas chromatographically determined in the test produce in a sample broken up through hydrazinolysis. The content of DEG was expressed in percent by mol of DEG with reference to the total amount of DEG and ehtylene glycol.

The esterification degree was calculated by determining the acid number and saponification number in the known manner. In order to determine the saponification number, the test product was boiled at reflux with 2 N alcoholic potash lye and, subsequently, potentiometrically titrated back with 1 N hydrochloric acid. In order to determine the acid number, the test product was dissolved in dimethylsulfoxide/water and potentiometrically titrated with 0.1 N hydrochloric acid.

EXAMPLE 1

A suspension was prepared containing 4.3 kg terephthalic acid and 3.2 kg ethylene glycol. $2 \times 10^{-4}$ mol lithium acetate was added to the suspension as catalyst and $2 \times 10^{-4}$ mol triphenyl phosphate as stabilizer. The mixture was charged into the reaction vessel and heated to a temperature of 240° C. Under an autogenous pressure of a maximum of 4 bar, the reaction mixture was subjected to reaction for a total of 50 minutes.

Figure 2:
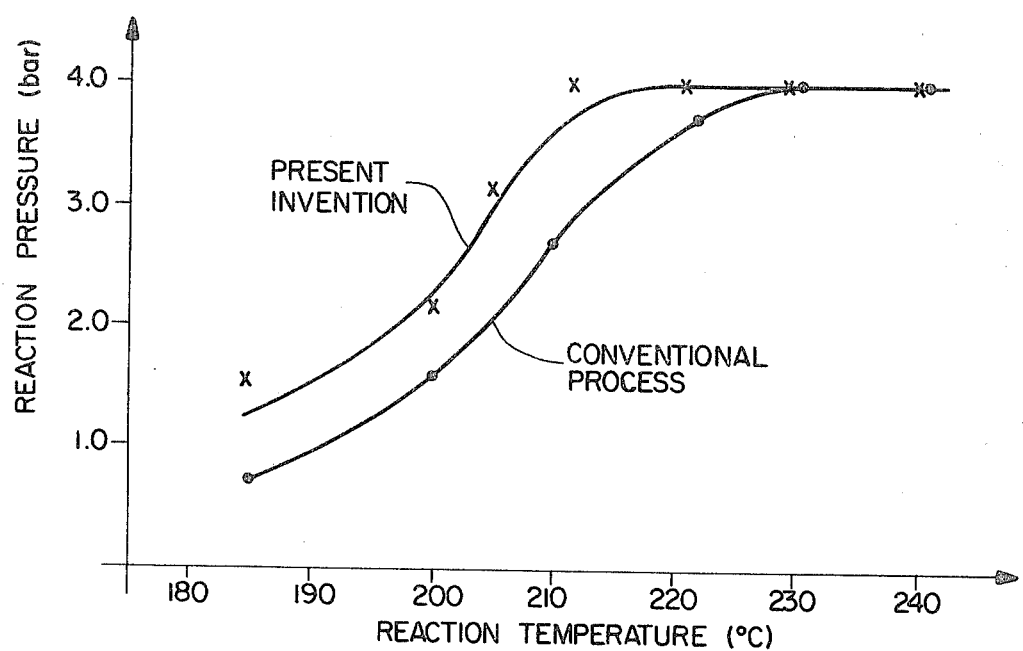
FIG. 2 is a graph showing the relationship between the reaction pressure and reaction temperature for the process of the present invention, and for a conventional process, in connection with the reaction between terephthalic acid and ethylene glycol.

The pressure rise which developed owing to the reaction in accordance with the process of this invention is graphically plotted in FIG. 2 as a function of the mean temperature of the reaction product, and this is compared with the pressure rise incurred during the reaction in an agitator vessel as in a conventional process. The effectiveness of the process of the invention is distinctly demonstrated by the fact that, in accordance with the process of this invention, the initial pressure is higher and the rated pressure is reached earlier than with the reaction in the agitator vessel. The fact that the reaction takes a faster course is proven by the analyses of the samples which were taken from the two reaction systems after 50 minutes. While the esterification degree amounted to 84% with the application of the process according to the invention, it was only 50% after the reaction in the agitator vessel. No differences were determined in the DEG content, which was 1.6 percent by mol in both samples.

EXAMPLE 2

A suspension was prepared containing 4.3 kg terephthalic acid and 3.2 kg ethylene glycol. $2 \times 10^{-4}$ mol lithium acetate was added to the suspension as catalyst and $2 \times 10^{-4}$ mol triphenyl phosphate as stabilizer. The mixture was charged into the reaction vessel and heated to a temperature of 270° C. Under an autogenous pressure of a maximum of 9 bar, the reaction mixture was subjected to reaction for 20 minutes. Into the BHET prepared in this manner, a suspension of terephthalic acid and ethylene glycol was continuously added, the composition of the suspension being identical with the originally charged mixture. The amount of suspension added corresponded with the desired means residence period in the apparatus according to the ratio of volume:rate of flow. The resultant mixture, in an adequate amount corresponding to the amount of added suspension, was continuously drained from the reaction vessel. A temperature difference of 7° C. was obtained when using the rotor-stator arrangement, resulting from a temperature at the inlet of the reaction vessel of 270° C. and a sump temperature of 263° C. owing to the heat of evaporation.

Figure 3:
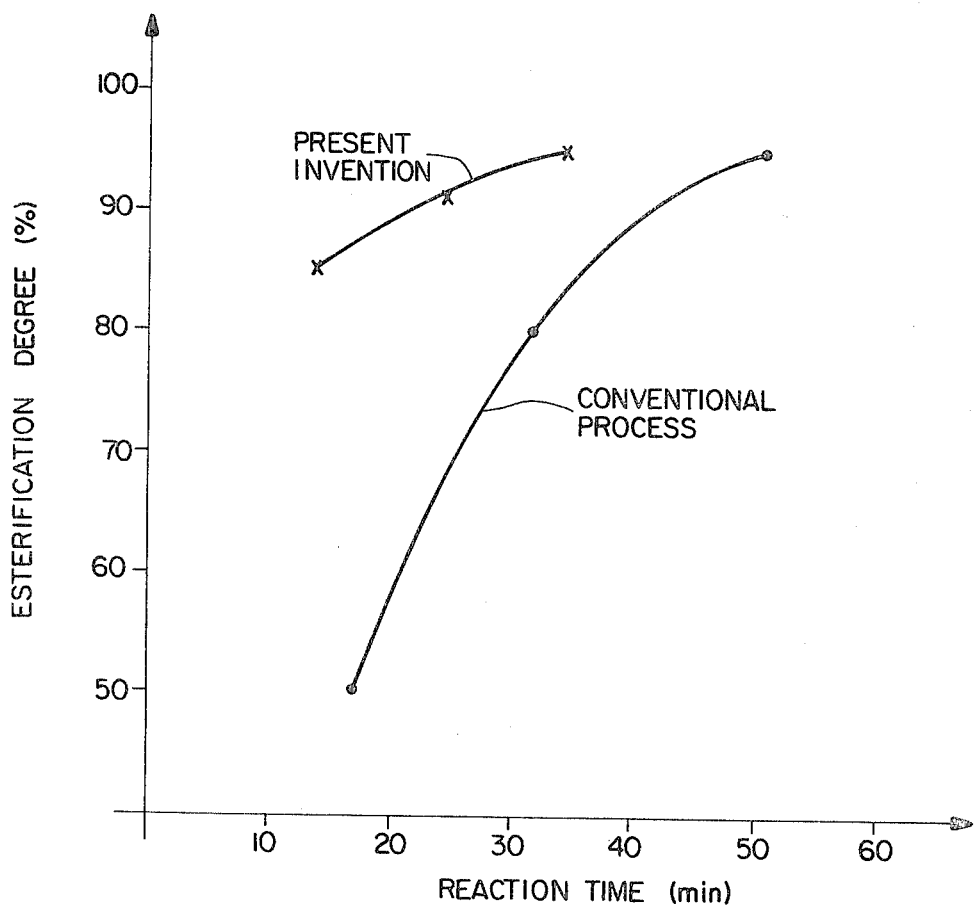
FIG. 3 is a graph showing the relationship between the esterification degree and the reaction time for the process of the present invention, and for a conventional process, in connection with the reaction between terephthalic acid and ethylene glycol.

The esterification degree obtained in this fashion is graphically plotted in FIG. 3 as a function of the residence period, in comparison with the esterification degree obtained with the reaction in an agitator vessel. It can be clearly recognized that the reaction takes a considerably faster course in accordance with the process of this invention than in an agitator vessel. Also, it can be concluded from the values for the DEG content, which amounted to 1.5 percent by mol in both cases, that no quality reduction of the reaction product occured in accordance with the process of this invention. This is clear proof of the superiority of the process according to the invention in comparison with the conventional process.

We claim:

1. In a process for continuous production of a polyester which comprises reacting (A) normally solid terephthalic acid with (B) normally liquid ethylene glycol, to produce a low molecular weight bis-$\beta$-hydroxyethylene terephthalate, subjecting said bis-$\beta$-hydroxyethylene terephthalate to precondensation under reduced pressure to produce an intermediate ethylene terephthalate product of increased molecular weight, and subjecting said intermediate product of polycondensation under further reduced pressure to increase the molecular weight of the intermediate product and thus produce polyethylene terephthalate, the improvement which comprises subjecting a mixture containing solid starting material (A) and liquid starting material (B) to the shearing and homogenizing action of a rotor-stator comprising rows of teeth and holes arranged in a ring-shape on the rotor and stator to form a series of shearing gaps, wherein said mixture is axially sucked into said rotor, subjected to shearing and homogenizing action in said rotor-stator to increase the surface area of said starting material (A), and to produce a homogeneous mixture containing (A) and (B), and then said homogeneous mixture is radially ejected from said stator, and introducing said homogeneous mixture into a thin-layer evaporator wherein said starting materials (A) and (B) are reacted with each other to produce a reaction mixture containing said low molecular weight bis-$\beta$-hydroxyethylene ester.

2. The process according to claim 1, wherein said thin-layer evaporator is a pipe reactor.

3. The process according to claim 2, wherein said starting materials (A) and (B) are initially introduced into the bottom portion of said pipe reactor, and are subsequently drained off, in admixture with a portion of said reaction mixture, from said pipe reactor, and introduced into said rotor-stator.

4. The process according to claim 2 or 3, wherein said homogeneous mixture is introduced into the top portion of said pipe reactor.

5. The process according to claim 4, further comprising heating said homogeneous mixture before said homogeneous mixture is introduced into said pipe reactor, or heating said homogeneous mixture in the top portion of said pipe reactor.

6. The process according to claim 3, further comprising heating said admixture of starting materials and reaction mixture in the bottom portion of said pipe reactor.

7. The process according to claim 2, wherein said homogeneous mixture is introduced into the top portion of said pipe reactor by means of a static or dynamic distribution system.

8. The process according to claim 2, further comprising venting vaporous distillation products from the top portion of said pipe reactor, and, optionally, purifying said distillation products and returning the purified products to said reaction mixture.

9. The process according to claim 2, further comprising introducing at least a portion of said reaction mixture into a second pipe reactor of the same or different design as the first pipe reactor.

* * * * *